United States Patent Office 2,703,288
Patented Mar. 1, 1955

2,703,288

STABLE EMULSION FOR TREATING FRUIT

Lee Worson, Los Angeles, Calif., assignor to Techkote Company, Incorporated, Inglewood, Calif., a corporation of California No Drawing. Application September 18, 1950, Serial No. 185,518

2 Claims. (Cl. 99—222)

My invention relates to the treatment of fruits and vegetables, particularly citrus fruit, and more particularly to a chemical method that cleanses fruit, inhibits it against mold, and imparts a protective coating to the exterior surface thereof.

Citrus fruit, when first received in packing houses from groves, is of a far different appearance than the fruit which is familiar to the public in markets, groceries and other business establishments where it is merchandised. The citrus fruit as received by packing houses is frequently covered with dust, dirt, and insects, and their deposits that have been accumulated thereon during growth, as well as oily and carbonaceous materials. The oily and carbonaceous materials are deposited on the fruit as a result of the use of smudge pots in which petroleum products are burned to prevent frosting of the trees and fruit in the groves during the winter months, or by oil spray, etc.

The exterior surface of citrus fruit, as is well known, is not perfectly smooth, but has numerous pores formed therein. Each of these pores provides a small cavity in which dust, dirt, oil, and carbonaceous materials tend to concentrate as the fruit is subjected to the action of sun, rain, dew, and dust. The removal of the foreign material from such pores presents a troublesome problem; and unless such foreign materials are completely removed without harm to the fruit, the appearance of the fruit is impaired to the extent that it cannot be sold as first-class merchandise.

When fruit is brought into a packing house, it is termed "turgid" and is left on the floor for two or three days to condition. If the fruit is not allowed to condition but is, instead, immediately placed into relatively high temperature treatments, the oil cells in the rind burst, provoking deterioration of the fruit. "Conditioning" before cleaning the fruit often results in excessive rot. Therefore, there are advantages in washing fruit before conditioning it, and that is possible only with lower temperature treatments.

Citrus fruit at present is normally subjected to three separate operations after it has reached a packing house. The first of these operations is concerned with the cleansing of the fruit which is accomplished by floating or moving the fruit through long baths of soapy water to which solvent is sometimes added. The fruit is then subjected to the action of rotating brushes. Such a procedure satisfactorily removes dust and dirt from the fruit, but it is not effective in removing oily and carbonaceous materials. Citrus fruit, after it is subjected to the conventional washing operation, frequently has a speckled appearance due to the oily and carbonaceous materials and plain dirt remaining in the pore cavities. In order to remove oily and carbonaceous materials, the fruit is subjected to washing at relatively high temperatures, which in extreme cases will go as high as 135 degrees F. The heat damages the rind of the fruit, resulting in accelerated rotting.

Citrus fruit, as is well known to those familiar with the storage of this commodity, is subject to various types of mold. This is prevented, to some extent, by subjecting the fruit to a mold inhibitor as a second step in processing the fruit for market.

The final step, after the fruit has been washed, inhibited and then rinsed, is to subject it to a waxing process. A film of inert, waxy material is applied to the exterior surface of the fruit by passing it through a spray of wax emulsion. The wax imparts a natural luster to the fruit which improves its appearance. It also forms a vapor barrier for the fruit during the time it is in storage which prevents shrinkage.

It is apparent that the above-described process for the treatment of citrus fruit has the disadvantages of not satisfactorily removing oily and carbonaceous materials lodged in the pores of the fruit and of requiring extensive plant facilities and mechanical equipment to handle large quantities of fruit. Extensive mechanical handling of fruit often results in injury to the fruit, another reason for excessive rotting of citrus fruit while in storage.

The primary purpose in devising my present invention is to provide a simple treatment that satisfactorily cleanses the fruit at relatively low temperatures, inhibits it exceptionally well against mold, and waxes the exterior surface thereof.

A major object of my invention is to supply a process to concurrently remove foreign material from the entire surface of citrus fruit, inhibit it against mold, and provide a protective film on the exterior surface thereof.

Another object of my invention is to furnish a process that is sufficiently flexible in operation so that the cleansing of the fruit, the inhibiting against mold, and the waxing of the surfaces thereof may be accomplished concurrently or in individual steps.

A still further object of my invention is to provide a chemical treatment for citrus fruits that requires but a fraction of the plant space and equipment now being used to carry out the cleansing, inhibiting and waxing operations; is less expensive to operate than the processes now being used to accomplish the same objects; is more rapid in operation than the processes now in use; requires less handling of the fruit; exposes the fruit to lower temperatures during treatment; substantially decreases the percentage of decay; and improves the appearance and touch.

Yet another object of my invention is to facilitate the upgrading of citrus fruit by substantially removing all of the foreign material from the exterior surface thereof.

These and other objects and advantages of my invention will become apparent from the following description of a preferred form thereof.

After the fruit is picked, it is transported to a packing plant or other establishment where it is to be treated, and is deposited in elongated tanks containing a fluid, the composition of which is hereinafter discussed in detail. Upon being deposited in the fluid bath, the fruit floats and is moved longitudinally in the tank and then onto the top of rotating brushes by conventional mechanical means employed for such purposes. Brushes are placed on the tank in such a position so as to allow the bristles to be submerged in approximately one-half inch of the solution. The solution is picked up by the brushes and as the fruit is inhibited and waxed while it is in the washing tank, thus preventing contact with spores in the air or in any ensuing rinse waters. The treated fruit can be rinsed, if desired, but it is not necessary. Water will not adhere to the fruit after the water-repellent coating is set.

The results attained by my process are due to the fact that the bath in the tank is formed of a special emulsion. This emulsion contains a cleaning medium, inhibitors, and a protective coating in both water and oil phases. The oil concentrate can be immediately dispersed in cold water with very slight agitation. This concentrate of the dispersed phase be diluted with water to form W/O or O/W emulsion and then further diluted on the job. The oil-phase concentrate contains detergents and emulsifying agents compounded with coating materials and inhibitors in such a manner as to give easy dispersion and relative stability, excellent cleansing properties, complete penetration of inhibitors into the immediate surface of the fruit, and a subsequent formation of a thin, water-repellent coating on the surface of the fruit.

In conjunction with my oil-phase concentrate, I have found it advantageous to use soap, or a combination of soap and detergents, in order to obtain an adequate amount of foam which facilitates the cleansing operation. In addition, under hard water conditions, sodium tripolyphosphate can be used advantageously. Additional inhibiting properties can be added to the bath for lemons by adding up to 2% by weight soda ash; and in a bath for oranges, a total of up to 7% by weight borax and/or boric acid can be added. Dispersion prepared in this manner cleans the fruit very efficiently at temperatures generally below 115 degrees F. Excellent results are obtained on smudged fruit at 100 degrees F. Non-smudged fruit can be cleaned at room temperature. After three minutes of soaking and then brushing, the fruit can be later rinsed with water, if desired.

The cumbersome, usual operation of drying oranges and grapefruit is practically eliminated by using my treatment. The water-repellent film when once "set" is not wetted by water. The fruit can be packed even when not completely dry. The droplets of water on the surface of the fruit do not contact the rind due to the protective water-repellent coating. This water is evaporated readily during storage, or in shipment.

Fruit treated by my process does not develop a rancid taste and can be packed in the usual manner, or in Pliofilm, etc. Non-dried fruit can be wrapped immediately in Pliofilm and then stored at room temperature for the entire length of the commercially-accepted storage period.

The composition of the concentrate used in forming the above-described emulsion is substantially as follows:

Percent by weight
Oronite (anionic emulsifier) _____ 10.1
Triton (non-ionic emulsifier and detergent) _____ 5.0
Farac (fatty acids) _____ 6.6
Xylene _____ 40.0
Cerezine (or paraffin wax) _____ 11.3
Paraffin oil _____ 25.2
Silicone _____ Up to 1

For a soft water bath of 2000 gallons to be used for lemons, 37.5 gallons of the concentrate and 37.5 gallons of soap and detergent (40% solids) have been used, plus up to 2% soda ash. For a soft water bath of 2000 gallons to be used for oranges, 37.5 gallons of the concentrate and 37.5 gallons of soap and detergent (40% solids) are recommended, plus up to 7% total of borax and/or boric acid. Under hard water conditions, sodium tripolyphosphate can be added to the baths advantageously.

Grapefruit and some lemons and oranges have very delicate rinds and must be treated at lower temperatures and/or lower concentration of the previously described concentrate. My process, being very flexible, allows the plant superintendent to fix the above conditions as well as the processing time, taking into consideration the existing equipment, conditions of fruit, etc.

While the fruit traverses the longitudinal length of the bath and brushes, it is subjected to the action of uniformly dispersed, innumerable, tiny particles of xylene which dissolve the foreign oily or carbonaceous materials deposited on the surface of the fruit. Concurrently, the dust and dirt deposited on the fruit are removed by the detergents which are dissolved in the water-phase of the emulsion.

The bath, as previously mentioned, has borax and/or boric acid, or soda ash dissolved therein, depending on whether oranges or lemons are being treated. All act as water-soluble mold inhibitors. A small amount of them is sealed on the surface of the fruit by the oil film.

The dispersed phase of the emulsion includes wax, paraffin oil, fatty acids, and silicone which are deposited as a protective film on the fruit. The Triton and Oronite are used as emulsifiers and detergents. Various combinations of anionic and non-ionic emulsifiers can be used, however.

The silicone is deposited on the fruit and gives surface protection as well as a more pleasing appearance and touch to the fruit. It also serves to control, to a certain degree, the stability of the emulsion and its "sizing" properties, and by itself is an excellent water-repellent agent.

Although I have specifically mentioned xylene as a constituent of the dispersed phase of the emulsion to dissolve foreign oily and carbonaceous materials from the surface of the fruit, I have found that any other hydrocarbon from the aromatic series such as benzene, toluene, and styrene (in solution), etc., may be used. In addition, I have found that such hydrocarbons, and preferably xylene, have mold inhibiting properties. A sufficient quantity of the hydrocarbon remains on the surface of the fruit after the oil film has dried, and some may possibly be absorbed into the rind of the fruit to protect it against mold. Therefore, the borax, boric acid, and soda ash may be omitted from the fluid bath, if desired.

Certain of the constituents of my invention have been referred to by the trade-mark under which they are sold. The composition and manufacturers of each of these constituents are listed below:

| Constituent | Composition | Manufacturer |
| --- | --- | --- |
| Oronite | Synthetic sulphonate | Oronite Chemical Company, San Francisco, Calif. |
| Farac | Fatty acid | The Foresac Company, Dalton, Ill. |
| Silicone | Organo-silicon oxide polymer. | Dow Corning Company, Midland, Mich. |
| Triton | Alkylated aryl polyether alcohol. | Rohm and Haas, Philadelphia, Pa. |

It is hereby understood that different substitutions can be used in order to obtain the above results, as for instance, paraffin in lieu of cerezine wax. It is to be further understood that the above disclosed method simply illustrates the excellent, practical results obtained by the use of my invention, and must not be considered as a limiting factor of the invention. It is not my intention to limit myself to the specified amounts and ingredients disclosed, but rather to outline a general method for my one-step method of processing fruits and vegetables.

Although the process for chemically-treating citrus fruit, above described, is fully capable of achieving the objects and providing the advantages hereinbefore mentioned, it is to be understood that it is merely illustrative of the presently preferred embodiment of my invention, and that I do not mean to limit myself to the details herein disclosed other than as defined in the appended claims. It is also to be understood that while I have chosen to illustrate my invention by examples selected from the citrus industry, that the invention may also be applied to other fruits and vegetables with but minor variations.

I claim:

1. A stable emulsion for use in concurrently cleansing fruit, inhibiting the fruit against mold, and coating the fruit with a film of an inert substance which includes: 37.5 gallons of a dispersed phase comprising by weight substantially 25.2% paraffin oil, 6.6% fatty acid, 40% xylene, 5% non-ionic emulsifier and detergent, 10.1% anionic emulsifier, and up to 1% of an organo-silicon oxide polymer, and substantially 2000 gallons of an enveloping phase comprising a water solution of a detergent and a mold inhibiting material, with said emulsion being substantially neutral.

2. A stable emulsion for use in concurrently cleansing fruit, inhibiting said fruit against mold, and coating said fruit with a film of an inert substance which includes: 37.5 gallons of a dispersed phase comprising by weight substantially 25.2% paraffin oil, 6.6% fatty acid, 40% of a single ring benzenoid hydrocarbon, 5% non-ionic emulsifier and detergent, and 10.1% anionic emulsifier, and substantially 2,000 gallons of an enveloping phase comprising a water solution of a detergent and a mold inhibiting material, with said emulsion being substantially neutral.

References Cited in the file of this patent

UNITED STATES PATENTS

| | | |
| --- | --- | --- |
| 1,809,016 | Brogden | June 9, 1931 |
| 1,943,468 | Bridgeman | Jan. 16, 1934 |
| 2,084,062 | Nedvidek | June 15, 1937 |
| 2,223,168 | Dombrow | Nov. 26, 1940 |
| 2,380,259 | Pierce | July 10, 1945 |
| 2,424,952 | Handy | July 29, 1947 |
| 2,432,310 | Greenstreet | Dec. 9, 1947 |
| 2,512,192 | Yen et al. | June 20, 1950 |